United States Patent
Yasukawa

(10) Patent No.: US 8,639,990 B2
(45) Date of Patent: Jan. 28, 2014

(54) INFORMATION PROCESSING APPARATUS THAT RECORDS LOGS, AND CONTROL METHOD AND STORAGE MEDIUM THEREFOR

(75) Inventor: Takuma Yasukawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 12/891,285

(22) Filed: Sep. 27, 2010

(65) Prior Publication Data

US 2011/0078515 A1 Mar. 31, 2011

(30) Foreign Application Priority Data

Sep. 28, 2009 (JP) ................................. 2009-222320

(51) Int. Cl.
*G06F 11/00* (2006.01)
(52) U.S. Cl.
USPC ............................................................. 714/48
(58) Field of Classification Search
USPC ............................................................. 714/48
See application file for complete search history.

(56) References Cited

U.S. PATENT DOCUMENTS

| | | | |
|---|---|---|---|
| 7,117,393 B2 * | 10/2006 | Baba et al. ...................... | 714/25 |
| 7,146,544 B2 * | 12/2006 | Hsu et al. ........................ | 714/57 |
| 7,213,176 B2 * | 5/2007 | Banko ........................ | 714/38.12 |
| 7,802,145 B1 * | 9/2010 | Bainbridge et al. ......... | 714/38.1 |
| 7,895,605 B2 * | 2/2011 | Goswami et al. ............. | 719/318 |
| 2005/0050392 A1 * | 3/2005 | Baba et al. ...................... | 714/25 |
| 2006/0020634 A1 * | 1/2006 | Huras et al. .................... | 707/200 |
| 2007/0083792 A1 * | 4/2007 | McDermott et al. ............ | 714/20 |
| 2009/0241011 A1 * | 9/2009 | Yamamoto ..................... | 714/769 |

FOREIGN PATENT DOCUMENTS

JP 05-197597 A 8/1993

* cited by examiner

*Primary Examiner* — Bryce Bonzo
*Assistant Examiner* — Elmira Mehrmanesh
(74) *Attorney, Agent, or Firm* — Rossi, Kimms & McDowell LLP

(57) ABSTRACT

An information processing apparatus capable of overwrite-recording time-series logs indicating an operation history and efficiently holding log information on operations relating to an occurring error. When an error is detected, a filtering object area is set that contains log information for a predetermined time period immediately before the error detection. Then, a type of the occurring error is identified, and log types to be protected are decided based on the identified error type. Among the filtering object area, log recording areas for the decided log types are decided as a to-be-protected log recording area. Subsequently, further log information is recorded so as to avoid the to-be-protected log recording area.

9 Claims, 4 Drawing Sheets

FIG.2

| | | TO-BE-PROTECTED LOG TYPES | | | | | | | |
|---|---|---|---|---|---|---|---|---|---|
| | | MEMORY | IMAGE | SCAN | PRINT | NETWORK | FAX | PDL | MEDIA | UI |
| ERROR TYPES | START-UP | ○ | ○ | ○ | ○ | ○ | ○ | ○ | ○ | ○ |
| | COPY | ○ | ○ | ○ | ○ | | | | | ○ |
| | PDL-PRINT | ○ | ○ | | ○ | ○ | ○ | ○ | | ○ |
| | MEDIA-PRINT | ○ | ○ | | ○ | | | | ○ | ○ |
| | SCAN-TO-MEDIA | ○ | ○ | ○ | | | | | ○ | ○ |
| | FAX(TX) | ○ | ○ | ○ | | | ○ | | | ○ |
| | FAX(RX) | ○ | ○ | | ○ | | ○ | | | ○ |

INFORMATION PROCESSING APPARATUS THAT RECORDS LOGS, AND CONTROL METHOD AND STORAGE MEDIUM THEREFOR

BACKGROUND OF THE INVENTION

1. Field of the Invention

The present invention relates to an information processing apparatus that records logs representing an operation history, a control method therefor, and a storage medium storing a program for executing the control method.

2. Description of the Related Art

Conventionally, an image processing apparatus mostly has a log recording memory area for recording and holding log information that represents an operation history in order to immediately solve an abnormality (error) occurring in the apparatus.

However, in some cases, such apparatus does not stop but continues to operate, even if an abnormality is detected. In that case, the log recording area overflows due to log information recording after occurrence of the abnormality, whereby required log information is lost. The recording area easily overflows especially in a multifunctionalized image processing apparatus in which even if some function becomes unusable due to the occurrence of error, the remaining functions can generally be used. Such problem can be solved by expanding the log recording area by using, e.g., an auxiliary storage device, but resulting in increased cost.

In this regard, Japanese Laid-open Patent Publication No. 05-197597, for example, discloses a technique of overwrite-recording log information in time series or dividing the log recording area on a per error type basis, thereby preventing log information from being lost.

On the other hand, image processing apparatuses nowadays used in the office environment generally not only have scan and copy functions, but also have various functions such as a network print function, a Scan-to-Media function for storing scanned electronic data to media, and a log-in function for user authentication to limit users allowed to use the apparatus. When the log recording technique disclosed in Japanese Laid-open Patent Publication No. 05-197597 is applied to the office environment where multi-function image processing apparatuses (more generally, information processing apparatuses) are often utilized, the following problems are posed.

In a case, for example, that the log recording area is divided on a per error type basis according to the above-described log recording technique, a problem is posed in an circumstance where only limited types of errors occur that log recording area portions for other error types are not efficiently utilized. In another case that log information is overwrite-recorded in time series, log information of types corresponding to the type of an occurring error cannot be selectively protected. Thus, log information required for investigation of the cause of error cannot securely be held in the log recording area.

SUMMARY OF THE INVENTION

The present invention provides an information processing apparatus capable of overwrite-recording log information (logs) representing an operation history in time series in a log recording area and capable of efficiently holding, in the log recording area, log information relating to an occurring operation error, and provides a control method for the information processing apparatus and a storage medium storing a program for executing the control method.

According to a first aspect of this invention, there is provided an information processing apparatus having a storage unit for storing logs, which comprises a decision unit configured, when an error has occurred in the information processing apparatus, to decide types of to-be-protected logs based on a type of the error, and a control unit configured to control such that logs of the types decided by said decision unit, among logs having been stored in the storage unit, are not erased in a case where a new log is stored in the storage unit after occurrence of the error in the information processing apparatus.

According to a second aspect of this invention, there is provided a control method for the information processing method described in the first aspect.

According to a third aspect of this invention, there is provided a storage medium storing a program for executing the control method described in the second aspect.

With this invention, in a case where log information representing an operation history is overwrite-recorded in time series, it is possible to efficiently hold log information relating to an occurring operation error.

Further features of the present invention will become apparent from the following description of an exemplary embodiment with reference to the attached drawings.

BRIEF DESCRIPTION OF THE DRAWINGS

FIG. 2 is a view showing a table in which a relation between error types and log types to be protected is shown;

FIG. 3 is a flowchart showing a log recording process; and.

DETAILED DESCRIPTION OF THE PREFERRED EMBODIMENT

The present invention will now be described in detail below with reference to the drawings showing a preferred embodiment thereof.

Figure 1:
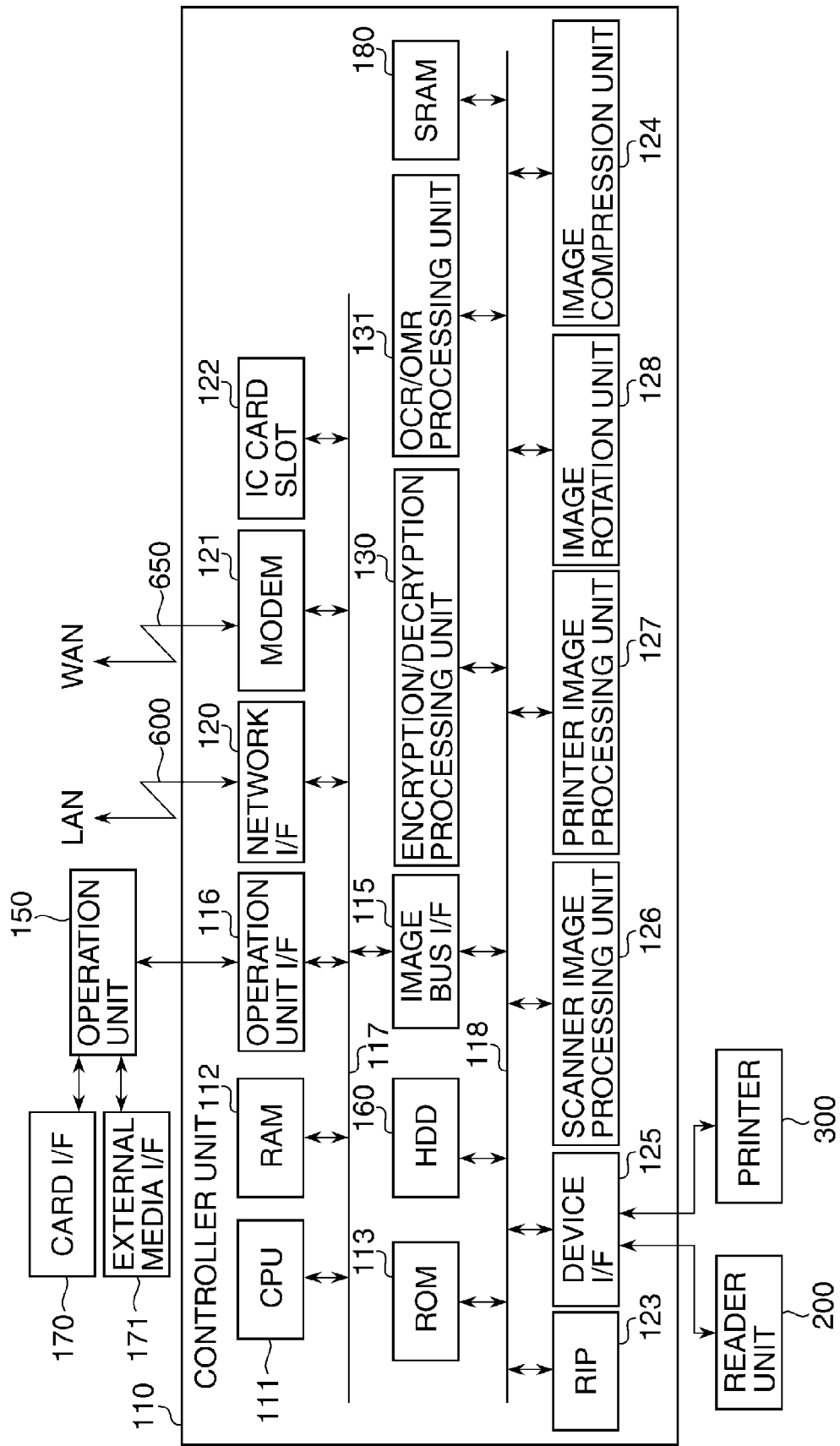
FIG. 1 is a block diagram showing the construction of a controller unit of an image processing apparatus according to one embodiment of this invention.

FIG. 1 shows in block diagram the construction of a controller unit of an image processing apparatus as an information processing apparatus according to one embodiment of this invention.

As shown in FIG. 1, the controller unit 110 is connected to a reader unit 200 as an image input device, a printer 300 as an image output device, a LAN 600, and a public line (WAN) 650.

The controller unit 110 includes a CPU 111, a RAM 112, an operation unit I/F 116, a network I/F 120, a modem 121, and an IC card slot 122, which are disposed on a system bus 117.

The CPU 111 is a controller that controls the entire system. The RAM 112 is a system work memory used by the CPU 111 for its operation and also used as an image memory that temporarily stores image data. The operation unit I/F 116, which functions as an interface unit with an operation unit 150, outputs to the operation unit 150 image data to be displayed thereon and conveys to the CPU 111 information input via the operation unit 150 by a user of this system. Reference numerals 170, 171 respectively denote a card I/F and an external media I/F which are connected to the operation unit 150.

The network I/F 120 is connected to the LAN 600 for input and output of information. The modem 121 is connected to the public line 650 for input and output of information. The IC card slot 122 is adapted to be inserted with an IC card media for user authentication.

The controller unit 110 has an image bus 118 for high-speed image data transfer, which is implemented by a PCI bus or IEEE 1394 bus. An image bus I/F 115 is a bus bridge for data structure conversion via which the system bus 117 is connected to the image bus 118.

On the image bus 118, there are disposed a ROM 113, hard disk drive (HDD) 160, raster image processor (RIP) 123, image compression unit 124, device I/F 125, scanner image processing unit 126, printer image processing unit 127, image rotation unit 128, encryption/decryption processing unit 130, OCR/OMR processing unit 131, and nonvolatile memory (SRAM) 180.

The ROM 113 functions as a boot ROM and stores a system boot program. The HDD 160 stores system software, image data, etc. The nonvolatile memory 180 stores user data, etc.

The raster image processor 123 develops PDL code into a bit map image. The image compression unit 124 performs JPEG compression and decompression of multi-valued image data, and performs JBIG, MMR, or MH compression and decompression of binary image data.

The device I/F 125 connects the controller unit 110 with the reader unit 200 and the printer 300 which are image input and output devices, and performs synchronous/asynchronous conversion of image data. The scanner image processing unit 126 performs correction, modification, and editing on input image data. The printer image processing unit 127 performs printer correction and resolution conversion on print-output image data.

The image rotation unit 128 performs rotation of image data. The encryption/decryption processing unit 130 is implemented by a hardware accelerator board that performs encryption/decryption processing by using a key of the IC card slot 122 or a device proper key. The OCR/OMR processing unit 131 decrypts character information or a two-dimensional barcode contained in image data and converts it into a character code.

FIG. 2 shows correspondance table in which a relation between types of errors which are assumed to occur in this embodiment and log types to be protected is shown. As described later, the correspondance table is used for protection of logs relating to operations that can be causes of errors.

First, a description is given of error types.

In the example shown in FIG. 2, error types are a start-up error, copy error, PDL print error, media print error, Scan-to-Media error, FAX transmission (TX) error, and FAX reception (RX) error.

The start-up error is an error that occurs at the time of start-up of the apparatus due to a hardware abnormality of the image processing apparatus 100, invalid user data being stored, or the like. The copy error is mainly due to an operation abnormality of the scanner image processing unit 126 or the printer image processing unit 127. The PDL print error is mainly due to an operation abnormality of the network 120, the raster image processor 123, or the printer image processing unit 127.

The media print is mainly due to an operation abnormality of the external media I/F 171 or the printer image processing unit 127. The Scan-to-Media error is mainly due to an operation abnormality of the scanner image processing unit 126 or the external media I/F 171. The FAX transmission (TX) error is mainly due to an operation abnormality of the scanner image processing unit 126 or the modem 121. The FAX reception (RX) error is mainly due to an operation abnormality of the modem 121 or the printer image processing unit 127.

It should be noted that image processing by each of the image bus I/F 117, the image bus 118, the image compression unit 124, and the device I/F 125 affects all the above described operations, and possibly becomes the causes of all the errors.

Next, a description is given of log types.

In the example shown in FIG. 2, log types are a memory log, image log, scan log, print log, network log, FAX log, PDL log, media log, and UI log.

The memory log relates to memory management for various jobs. The image log relates to image processing such as image compression, image decompression, and created image size. The scan log relates to a scan operation such as read image size. The print log relates to a print operation performed on a per page basis.

The network log relates to communication including a transmission job. The FAX log relates to FAX including CODEC, etc. The PDL log relates to PDL interpretation or bitmap image development. The media log mainly relates to media file access. The UI log relates to operated keys or transmission of data to be drawn on a touch panel.

Figure 3:
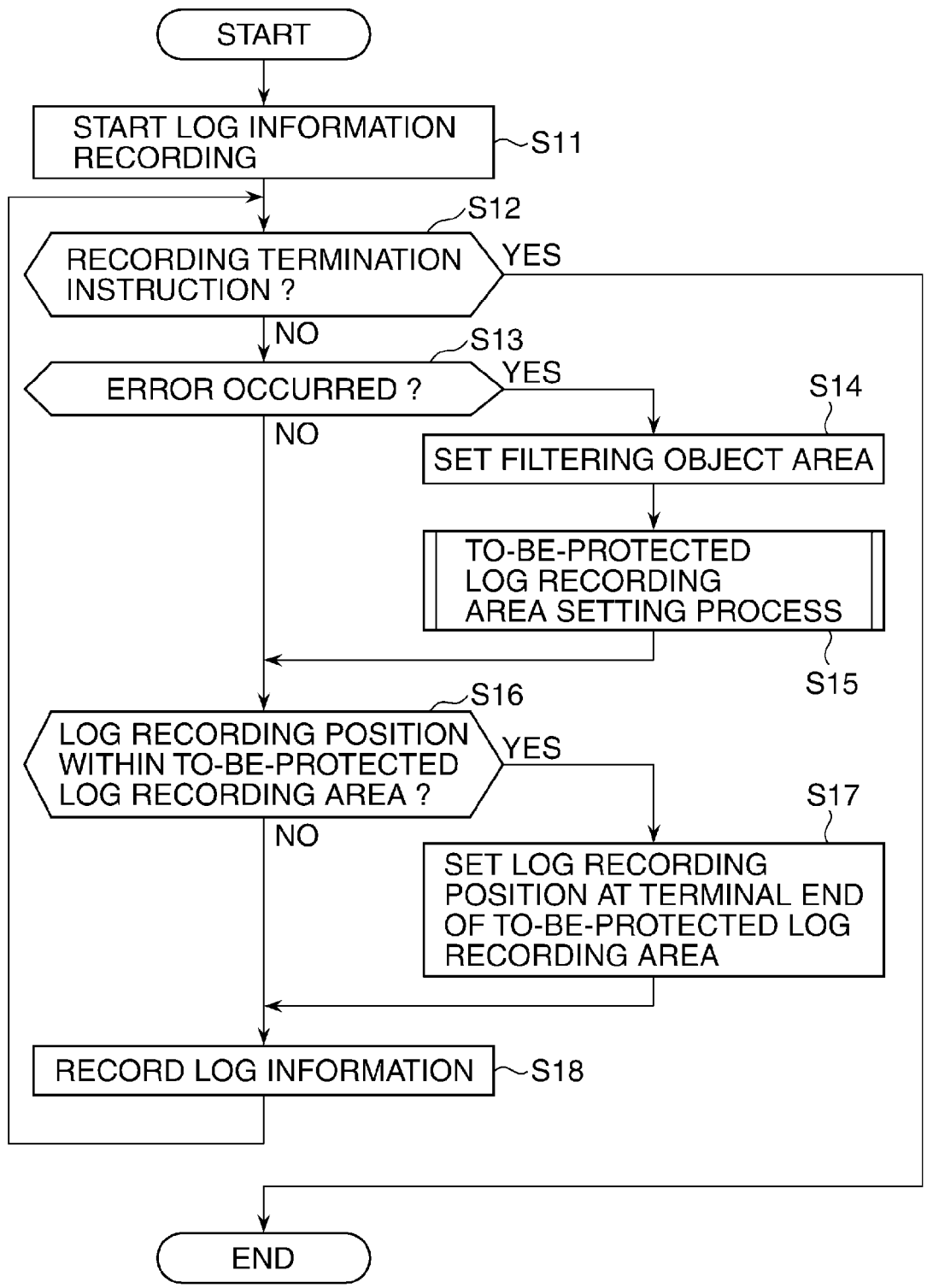

Next, with reference to FIG. 3, a description is given of a log recording process in which log information representing an operation history is overwrite-recorded in time series.

FIG. 3 shows the log recording process in flowchart.

In step S11, the CPU 111 starts recording log information. In the next step S12, the CPU 111 determines whether it accepts a recording termination instruction. When determining that the CPU 111 accepts a recording termination instruction, the CPU stops recording the log information and completes the log recording process. When determining that the CPU 111 does not accept a recording termination instruction, the flow proceeds to step S13.

In step S13, the CPU 111 determines whether an operation error has occurred in the image processing apparatus. If it is determined that an error has occurred, the flow proceeds to step S14. If it is determined that an error has not occurred, the flow proceeds to step S16.

In step S14, the CPU 111 sets a filtering object area in a log recording area provided in the RAM 112, HDD 160, or SRAM 180. The filtering object area is a part to be subjected to filtering among log recording area portions in which log information has been recorded. More specifically, the filtering object area is a log recording area portion in which log information for a predetermined time period immediately before error detection (that begins at a time point going back from occurrence of the error) has been recorded or in which log information of a predetermined size immediately before error detection (that begins at a storage position going back from occurrence of the error) has been recorded.

In step S15, the CPU 111 sets a to-be-protected log recording area (i.e., a log recording area portion to be protected so that log information recorded therein is not erased by overwriting) among the set filtering object area set in step S14. The details of step S15 will be described in detail below.

In the next step S16, the CPU 111 determines whether a log recording position is within the to-be-protected log recording area. If it is determined that the log recording position is within the to-be-protected log recording area, the flow proceeds to step S17. If it is determined that the log recording position is not within the to-be-protected log recording area, the flow proceeds to step S18.

In step S17, the CPU 111 sets the log recording position at a terminal end of the to-be-protected log recording area. In step S18, the CPU 111 records log information. At that time, a log type identifier is recorded simultaneously with the log information. Then, further log information is recorded in the log recording area so as to avoid the to-be-protected log recording area. As previously described, the log recording area is provided in the RAM 112, HDD 160, or SRAM 180.

Next, a to-be-protected log recording area setting process will be described in detail with reference to FIG. 4.

Figure 4:
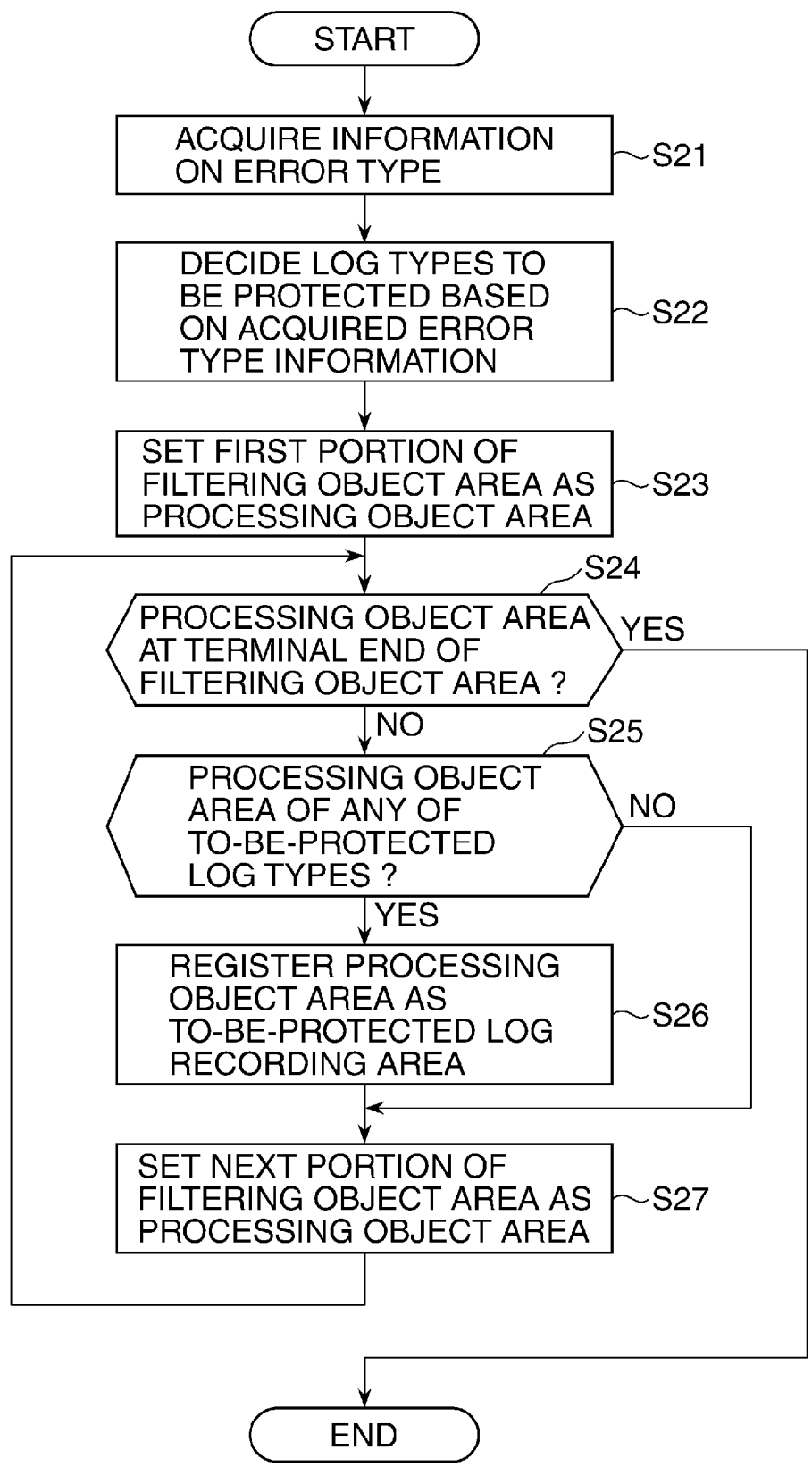
FIG. 4 is a flowchart showing the details of a to-be-protected log recording area setting process performed in the log recording process.

FIG. 4 shows in flowchart the details of the to-be-protected log recording area setting process performed in step S15 in FIG. 3.

In step S21, the CPU 111 acquires information on error type of the error detected in the error detection process in step S13 in FIG. 3, and identifies the type of the error that has occurred. Error types are decided in advance as already described referring to FIG. 2, and information on error types is stored in a memory of the image processing apparatus.

In the next step S22, the CPU 111 decides log types to be protected based on the acquired error type information by referring to the correspondance table shown in FIG. 2.

In the next step S23, the CPU 111 sets a first portion of the filtering object area, as a processing object area, i.e., an area to be subjected to a determination to determine whether the area is the to-be-protected log recording area.

In the next step S24, the CPU 111 determines whether the processing object area is at the terminal end of the filtering object area. When determining that the processing object area is at the terminal end of the filtering object area, the CPU 111 completes the log protection process. If it is determined that the processing object area is not at the terminal end of the filtering object area, the flow proceeds to step S25.

In step S25, the CPU 111 determines whether the processing object area is of any of the to-be-protected log types decided in step S22. If it is determined that processing object area is of any of the to-be-protected log types, the flow proceeds to step S26. If it is determined that processing object area is not of any of the to-be-protected log types, the flow proceeds to step S27.

In step S26, the CPU 111 additionally registers the processing object area, as a to-be-protected log recording area, to a table (not shown) for to-be-protected log recording area, thereby performing a log protection process, whereupon the flow proceeds to step S27.

In step S27, the next portion of the filtering object area is set as a processing object area. Then, the flow returns to step S24.

According to this embodiment, when an error is detected, a filtering object area is set that contains log information (logs) for a predetermined time period or of a predetermined size immediately before the error detection, and a to-be-protected log recording area is set among the filtering object area. As a result, an area in which log information on operations relating to the occurring error has been recorded can selectively be set as a to-be-protected log recording area. Since a further log information (a new log) is recorded so as to avoid the to-be-protected log recording area, the to-be-protected log information is not lost by overwriting.

In setting the to-be-protected log recording area, the type of the occurring error is identified, and log types to be protected are decided based on the identified error type. Then, log recording areas of the decided log types are set as a to-be-protected log recording area and protects log information stored therein, whereby log information of types corresponding to the type of the occurring error can selectively be protected.

Accordingly, in an office environment where multi-function image processing apparatuses are utilized, when an error occurs in any of the apparatuses while apparatus functions are used, it is possible to protect and acquire log information limited so as to relate to an operation that is the cause of the error. It is therefore possible to selectively protect log information (logs) on relevant operations required for investigation of the cause of the error. If it is assumed, for example, that an error is detected during execution of a Scan-to-Media job after a copy job and a FAX job are executed, log information relating to print operations in the copy job and the FAX job and log information at the time of reception in the FAX job are not held. In other words, these log information are not handled as to-be-protected log information but handled as log information allowed to be erased by overwriting at the time of subsequent log information recording, whereby the log recording area can efficiently be used. As a result, the log recording area can be reduced in size, and a reduction in cost can be achieved.

OTHER EMBODIMENTS

Aspects of the present invention can also be realized by a computer of a system or apparatus (or devices such as a CPU or MPU) that reads out and executes a program recorded on a memory device to perform the functions of the above-described embodiment, and by a method, the steps of which are performed by a computer of a system or apparatus by, for example, reading out and executing a program recorded on a memory device to perform the functions of the above-described embodiment. For this purpose, the program is provided to the computer for example via a network or from a recording medium of various types serving as the memory device (e.g., computer-readable medium).

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2009-222320, filed Sep. 28, 2009, which is hereby incorporated by reference herein in its entirety.

What is claimed is:

1. An information processing apparatus having a storage unit for storing logs, the information processing apparatus comprising:
    a scan unit configured to read an image on an original with image data; and
    a printer unit configured to execute printing based on the image data;
    a decision unit configured to decide a type of a to-be-protected log based on a type of an error, in a case where the error occurs in the information processing apparatus, the type of the to-be-protected log corresponding to the type of the error; and
    a control unit configured to store a new log in the storage unit without overwriting any log, previously stored in the storage unit, of the at least one type decided by the decision unit after occurrence of the error in the information processing apparatus.

2. The information processing apparatus according to claim 1, wherein the control unit stores the new log in the storage unit without overwriting any log of the type decided by the decision unit for a predetermined time period beginning at a time point from occurrence of the error in the information processing apparatus.

3. The information processing apparatus according to claim 1, wherein the control unit stores the new log in the storage unit without overwriting any log of the type decided by the decision unit and of a predetermined storage size beginning at a storage position from occurrence of the error in the information processing apparatus.

4. The information processing apparatus according to claim 1, wherein logs to be stored in the storage unit include information of an operation history.

5. The information processing apparatus according to claim 1, wherein the decision unit is configured to decide a plurality of types of to-be-protected logs based on the type of the error.

6. A control method for an information processing apparatus having a storage unit for storing logs, a scan unit configured to read an image on an original with image data, and a printer unit configured to execute printing based on the image data, the control method comprising the steps of:

deciding a type of a to-be-protected log based on a type of an error, in a case where the error occurs in the information processing apparatus, the type of the to-be-protected log corresponding to the type of the error; and controlling to store a new log in the storage unit without overwriting any log, previously stored in the storage unit, of the type decided in the deciding step after occurrence of the error in the information processing apparatus.

7. The control method according to claim 6, wherein the deciding step decides a plurality of types of to-be-protected logs based on the type of an error.

8. A non-transitory storage medium storing a program for causing an information processing apparatus, having a storage unit for storing logs, a scan unit configured to read an image on an original with image data, and a printer unit configured to execute printing based on the image data, to execute a method comprising the steps of:

deciding a type of a to-be-protected log based on a type of an error in a case where the error occurs in the information processing apparatus, the type of the to-be-protected log corresponding to the type of the error; and controlling to store a new log in the storage unit without overwriting any log, previously stored in the storage unit, of the type decided in the deciding step after occurrence of the error in the information processing apparatus.

9. The non-transitory storage medium according to claim 8, wherein the deciding step decides a plurality of types of to-be-protected logs based on the type of an error.

* * * * *